June 6, 1933.   E. FARKAS   1,912,767
PHOTOGRAPHIC FOLDING CAMERA
Filed June 12, 1930

INVENTOR
Eugene Farkas
BY
ATTORNEY

Patented June 6, 1933

1,912,767

UNITED STATES PATENT OFFICE

EUGENE FARKAS, OF BROOKLYN, NEW YORK

PHOTOGRAPHIC FOLDING CAMERA

Application filed June 12, 1930. Serial No. 460,624.

The present invention relates to improvements in cameras and particularly of the folding type, pocket size photographic cameras.

It is an object of this invention to provide a simple, reliable casing for a camera which will be neat in appearance and inexpensive in construction.

It is a further object to provide an improved means for attaching a door to a folding camera which will be easy to operate and which will remain rigid throughout the life of the camera.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description, taken in connection with the accompanying drawing, in which:—

Figure 1:
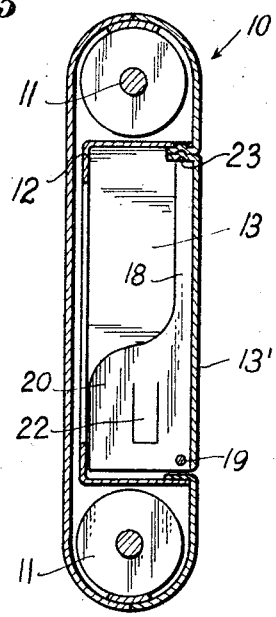
Figure 1 is a sectional elevation of a camera made in accordance with this invention.
Figure 2:
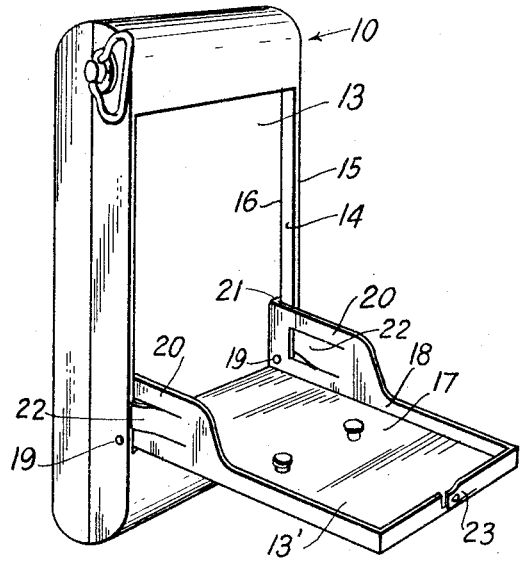
Figure 2 is a perspective view of a camera with the door open.
Figure 3:
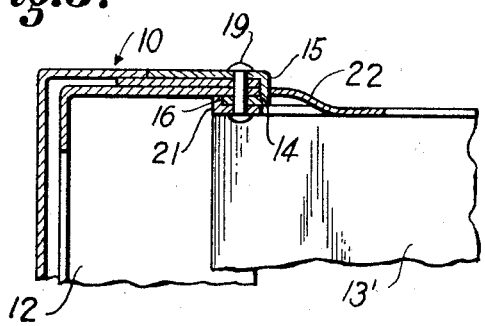
Figure 3 is a detail showing the hinge and door retaining device.

In the drawing the numeral 10 designates a box structure which may contain appropriate means for retaining spools 11 carrying a photographic film and with a support 12 for maintaining the film in the focal plane. The front face of the box is provided with an opening 13 in which is pivoted a door 13', the box itself at the edges of the opening is provided with an element having a front face and a rear face adapted to cooperate with a device upon the door to retain the door rigid in the open position.

As illustrated, this element comprises a flange 14 which may be formed from the material of the casing, bent backwardly upon itself as shown, providing a front face 15 and a rear face 16. The door itself may consist of a flat plate 17 bent up at its edges as shown at 18 to reenforce and rigidify the plate. This door is hinged to the framework by suitable pins 19 which, as shown, pass through the flanges 14 and 18. Adjacent to the hinge 19 this flange is made much wider to form an integral brace 20 of which one may be provided, if desired, upon each side. Upon each of these braces there are elements to engage the front and rear faces 15 and 16 of the flange 14'.

In the particular embodiment shown, this is achieved by bending the rear edge of the brace at an angle outwardly as shown at 21 to form a projection to engage the rear face 16 to limit the extent to which the door may be opened. A spring finger 22 is cut from the brace and bent outwardly in a position to engage the front face 15 to hold the door open. This bent portion 21 and the finger 22 are so placed that when the door is in the full outward position, it will be held rigidly without lost motion.

Means will be provided upon the door such as a spring pin 23 to hold the door closed.

With this construction it will be evident that as the door is opened, the spring finger 22 will snap into place as soon as the door is completely opened and thereupon the door will be rigidly held against movement in either direction. When it is desired to close the door, this may be readily accomplished by pressing in the spring finger 22 to cause it to disengage the flange 14'.

This construction is economical to manufacture and reliable in operation.

Having described my invention, what I claim as new and desire to secure by Letters Patent is:—

1. In a folding camera, the combination with a casing having an aperture and an inwardly bent rectangular flange in one side thereof, a door provided with two angularly extending side walls and one end wall and being pivotally mounted in said aperture, said side walls being provided with angular extensions adjacent the pivots and engaging with the inwardly bent rectangular flange of the casing when said door is swung open and in right-angular relation with said casing.

2. In a folding camera, the combination with a casing having an aperture and an inwardly bent rectangular flange in one side thereof, a door pivotally mounted in said aperture and provided with integral angular extensions adjacent the pivot end and engaging with the inwardly bent rectangular flange of the casing when said door is swung outwardly in substantially right-angular relation with said casing thereby limiting the outward swing to a predetermined maximum, and spring means integral with said door at the pivot end, and engaging said casing for locking said door against inward rotation.

3. In a folding camera, the combination with a casing having an aperture and an inwardly bent rectangular flange in one side thereof, a door for closing said aperture pivotally mounted therein, said door being provided at the pivot end with integral angular extensions engageable with said inwardly bent flange to limit its outward swing and with integral spring means for locking said door against inward rotation when in full open position, and said door being also provided with integral spring means at the free end for locking said door when in a closed position, said spring means providing a snap action in opening and closing of the door.

4. A folding box camera comprising in combination a casing having an aperture in one side thereof, a door for closing said aperture pivoted in said opening, said casing having an element on one side of said aperture, adjacent to the pivot, having a front and rear face, said door being provided at the pivot end with an integral angular extension having a front and rear arm spaced apart a distance equal to the distance between said front and rear faces, and situated to engage said faces when said door is open.

5. A folding box camera comprising in combination a casing having an aperture in one side thereof, a door for closing said aperture pivoted in said opening, said casing having an element on one side of said aperture, adjacent to the pivot, having a front and rear face, said door being provided at the pivot end with an integral angular extension having a front and rear arm spaced apart a distance equal to the distance between said front and rear faces, and situated to engage said faces when said door is open, said front arm being spring pressed outwardly for movement in the plane of said front face to snap into engagement with said front face as said door is opened.

Signed at New York, in the county of New York and State of New York, this 29th day of May, A. D. 1930.

EUGENE FARKAS.